(12) United States Patent
Sheets et al.

(10) Patent No.: US 7,574,846 B2
(45) Date of Patent: Aug. 18, 2009

(54) PROCESS AND DEVICE FOR CONVEYING ODD-SHAPED CONTAINERS

(75) Inventors: Philip Sheets, York, PA (US); Paul Kelley, Wrightsville, PA (US); John Denner, York, PA (US)

(73) Assignee: Graham Packaging Company, L.P., York, PA (US)

( * ) Notice: Subject to any disclaimer, the term of this patent is extended or adjusted under 35 U.S.C. 154(b) by 0 days.

(21) Appl. No.: 10/558,284

(22) PCT Filed: Mar. 11, 2005

(86) PCT No.: PCT/US2005/008374

§ 371 (c)(1),
(2), (4) Date: Oct. 20, 2006

(87) PCT Pub. No.: WO2005/087628

PCT Pub. Date: Sep. 22, 2005

(65) Prior Publication Data

US 2007/0181403 A1    Aug. 9, 2007

Related U.S. Application Data

(60) Provisional application No. 60/551,772, filed on Mar. 11, 2004.

(51) Int. Cl.
*B65B 63/08* (2006.01)
*B67C 3/24* (2006.01)
*B65B 7/28* (2006.01)

(52) U.S. Cl. .............................. 53/440; 53/471; 53/127; 53/282; 53/368; 198/803.8

(58) Field of Classification Search .................. 53/440, 53/471, 127, 281, 282, 368, 369; 198/803.8
See application file for complete search history.

(56) References Cited

U.S. PATENT DOCUMENTS

D110,624 S    7/1938    Mekeel, Jr.
(Continued)

FOREIGN PATENT DOCUMENTS

AU    2002257159 B2    4/2003
(Continued)

OTHER PUBLICATIONS

"Application and Development of PET Plastic Bottle," Publication of Tsinghad Tongfang Optical Disc Co. Ltd., Issue 4, 2000, p. 41. (No English language translation available).

(Continued)

*Primary Examiner*—Stephen F Gerrity
(74) *Attorney, Agent, or Firm*—Miles & Stockbridge P.C.; James T. Carmichael; Patrick L. Miller (57) ABSTRACT

A process for efficiently conveying containers along a table-top conveying system includes the steps of temporarily securing a transfer stabilizing support (1a, 1b) to a bottom end of a formed container (14) so that the container can freely move along a production line using the table-top conveying system where the transfer stabilizing support has a bottom surface (2a, 2b) with an opening (4a, 4b), a sidewall (6a, 6b) extending substantially perpendicular to the bottom surface, and a ridge area (10b) surrounding the opening and inside the sidewall of the support; and after the container has gone through operations of the production line, the transfer stabilizing support is removed so that aesthetic qualities of the formed container shape are revealed.

14 Claims, 4 Drawing Sheets

U.S. PATENT DOCUMENTS

| | | | |
|---|---|---|---|
| 2,378,324 A * | 6/1945 | Ray et al. ..................... 53/282 |
| 2,960,248 A | 11/1960 | Kuhlman |
| 3,043,461 A | 7/1962 | Glassco |
| 3,397,724 A | 8/1968 | Bolen et al. |
| 3,409,167 A | 11/1968 | Blanchard |
| 3,468,443 A | 9/1969 | Marcus |
| 3,485,355 A | 12/1969 | Stewart |
| 3,727,783 A | 4/1973 | Carmichael |
| 3,918,920 A * | 11/1975 | Barber ....................... 422/104 |
| 3,935,955 A | 2/1976 | Das |
| 3,941,237 A * | 3/1976 | MacGregor, Jr. ....... 198/867.13 |
| 4,036,926 A | 7/1977 | Chang |
| 4,125,632 A | 11/1978 | Vosti et al. |
| 4,134,510 A | 1/1979 | Chang |
| 4,170,622 A | 10/1979 | Uhlig et al. |
| 4,174,782 A | 11/1979 | Obsomer |
| 4,231,483 A | 11/1980 | Dechenne et al. |
| 4,301,933 A | 11/1981 | Yoshino et al. |
| 4,318,489 A | 3/1982 | Snyder et al. |
| 4,318,882 A | 3/1982 | Agrawal et al. |
| 4,338,765 A | 7/1982 | Ohmori et al. |
| 4,355,728 A | 10/1982 | Ota et al. |
| 4,381,061 A | 4/1983 | Cerny et al. |
| D269,158 S | 5/1983 | Gaunt et al. |
| 4,386,701 A | 6/1983 | Galer |
| 4,436,216 A | 3/1984 | Chang |
| 4,450,878 A | 5/1984 | Takada et al. |
| 4,610,366 A | 9/1986 | Estes et al. |
| 4,628,669 A | 12/1986 | Herron et al. |
| 4,642,968 A | 2/1987 | McHenry et al. |
| 4,667,454 A | 5/1987 | McHenry et al. |
| 4,684,025 A | 8/1987 | Copland et al. |
| D292,378 S | 10/1987 | Brandt et al. |
| 4,773,458 A | 9/1988 | Touzani |
| 4,785,949 A | 11/1988 | Krishnakumar et al. |
| 4,785,950 A | 11/1988 | Miller et al. |
| 4,807,424 A | 2/1989 | Robinson et al. |
| 4,831,050 A | 5/1989 | Bettle |
| 4,850,493 A | 7/1989 | Howard, Jr. |
| 4,850,494 A | 7/1989 | Howard, Jr. |
| 4,867,323 A | 9/1989 | Powers |
| 4,880,129 A | 11/1989 | McHenry et al. |
| 4,892,205 A | 1/1990 | Powers et al. |
| 4,896,205 A | 1/1990 | Weber |
| 4,967,538 A | 11/1990 | Leftault, Jr. et al. |
| 4,997,692 A | 3/1991 | Yoshino |
| 5,005,716 A | 4/1991 | Eberle |
| 5,014,868 A | 5/1991 | Wittig et al. |
| 5,024,340 A | 6/1991 | Alberghini et al. |
| 5,060,453 A | 10/1991 | Alberghini et al. |
| 5,067,622 A | 11/1991 | Garver et al. |
| 5,090,180 A | 2/1992 | Sorensen |
| 5,092,474 A | 3/1992 | Leigner |
| 5,133,468 A | 7/1992 | Brunson et al. |
| 5,217,737 A | 6/1993 | Gygax et al. |
| 5,234,126 A | 8/1993 | Jonas et al. |
| 5,244,106 A | 9/1993 | Takacs |
| 5,251,424 A * | 10/1993 | Zenger et al. ................. 53/471 |
| 5,255,889 A | 10/1993 | Collette et al. |
| 5,261,544 A | 11/1993 | Weaver, Jr. |
| 5,281,387 A | 1/1994 | Collette et al. |
| 5,341,946 A | 8/1994 | Vallincourt et al. |
| 5,392,937 A | 2/1995 | Prevot et al. |
| 5,411,699 A | 5/1995 | Collette et al. |
| 5,472,181 A | 12/1995 | Lowell |
| RE35,140 E | 1/1996 | Powers, Jr. |
| 5,484,052 A | 1/1996 | Pawloski et al. |
| 5,503,283 A | 4/1996 | Semersky |
| 5,598,941 A | 2/1997 | Semersky et al. |
| 5,642,826 A | 7/1997 | Melrose |
| 5,672,730 A | 9/1997 | Cottman |
| 5,690,244 A | 11/1997 | Darr |
| 5,713,480 A | 2/1998 | Petre et al. |
| 5,730,914 A | 3/1998 | Ruppman, Sr. |
| 5,737,827 A | 4/1998 | Kuse et al. |
| 5,780,130 A | 7/1998 | Hansen et al. |
| 5,785,197 A | 7/1998 | Slat |
| 5,829,614 A | 11/1998 | Collette et al. |
| 5,887,739 A | 3/1999 | Prevot et al. |
| 5,888,598 A | 3/1999 | Brewster et al. |
| 5,897,090 A * | 4/1999 | Smith et al. ............... 248/311.2 |
| 5,906,286 A | 5/1999 | Matsuno et al. |
| 5,908,128 A | 6/1999 | Krishnakumar et al. |
| D415,030 S | 10/1999 | Searle et al. |
| 5,976,653 A | 11/1999 | Collette et al. |
| RE36,639 E | 4/2000 | Okhai |
| 6,065,624 A | 5/2000 | Steinke |
| 6,213,325 B1 | 4/2001 | Cheng et al. |
| 6,228,317 B1 | 5/2001 | Smith et al. |
| 6,230,912 B1 | 5/2001 | Rashid |
| 6,277,321 B1 | 8/2001 | Vailliencourt et al. |
| 6,298,638 B1 | 10/2001 | Bettle |
| 6,375,025 B1 | 4/2002 | Mooney |
| 6,390,316 B1 | 5/2002 | Mooney |
| 6,413,466 B1 | 7/2002 | Boyd et al. |
| 6,439,413 B1 | 8/2002 | Prevot et al. |
| 6,467,639 B2 | 10/2002 | Mooney |
| 6,485,669 B1 | 11/2002 | Boyd et al. |
| 6,502,369 B1 | 1/2003 | Andison et al. |
| 6,514,451 B1 | 2/2003 | Boyd et al. |
| 6,585,124 B2 | 7/2003 | Boyd et al. |
| 6,595,380 B2 | 7/2003 | Silvers |
| 6,612,451 B2 | 9/2003 | Tobias et al. |
| 6,662,960 B2 | 12/2003 | Hong et al. |
| 6,749,780 B2 | 6/2004 | Tobias |
| 6,763,968 B1 | 7/2004 | Boyd et al. |
| 6,923,334 B2 | 8/2005 | Melrose et al. |
| 6,942,116 B2 | 9/2005 | Lisch et al. |
| 7,051,889 B2 | 5/2006 | Boukobza |
| 7,077,279 B2 | 7/2006 | Melrose |
| 7,137,520 B1 | 11/2006 | Melrose |
| 7,150,372 B2 | 12/2006 | Lisch et al. |
| 2001/0035391 A1 | 11/2001 | Young et al. |
| 2002/0074336 A1 | 6/2002 | Silvers |
| 2002/0096486 A1 | 7/2002 | Bourque |
| 2002/0153343 A1 | 10/2002 | Tobias et al. |
| 2003/0186006 A1 | 10/2003 | Schmidt et al. |
| 2003/0196926 A1 | 10/2003 | Tobias et al. |
| 2003/0217947 A1 | 11/2003 | Ishikawa et al. |
| 2004/0149677 A1 | 8/2004 | Slat et al. |
| 2004/0173565 A1 | 9/2004 | Semersky et al. |
| 2004/0211746 A1 | 10/2004 | Trude |
| 2006/0006133 A1 | 1/2006 | Lisch et al. |
| 2006/0138074 A1 | 6/2006 | Melrose |
| 2006/0231985 A1 | 10/2006 | Kelley |
| 2006/0243698 A1 | 11/2006 | Melrose |
| 2006/0255005 A1 | 11/2006 | Melrose et al. |
| 2006/0261031 A1 | 11/2006 | Melrose |
| 2007/0051073 A1 | 3/2007 | Kelley et al. |
| 2007/0084821 A1 | 4/2007 | Bysick et al. |
| 2007/0181403 A1 | 8/2007 | Sheets et al. |
| 2007/0199915 A1 | 8/2007 | Denner et al. |
| 2007/0199916 A1 | 8/2007 | Denner et al. |
| 2007/0215571 A1 | 9/2007 | Trude |
| 2007/0235905 A1 | 10/2007 | Trude et al. |
| 2008/0047964 A1 | 2/2008 | Denner et al. |

FOREIGN PATENT DOCUMENTS

| | | |
|---|---|---|
| CA | 2077717 A1 | 3/1993 |
| DE | P2102319.8 | 8/1972 |
| EP | 0 551 788 A1 | 7/1993 |
| EP | 0 609 348 B1 | 2/1997 |
| EP | 0 916 406 | 5/1999 |

| | | | |
|---|---|---|---|
| EP | 1 063 076 A1 | 12/2000 | |
| FR | 1571499 | 6/1969 | |
| GB | 1 113988 | 5/1968 | |
| GB | 2050919 A | 1/1981 | |
| JP | 48-31050 | 9/1973 | |
| JP | 54-72181 A | 6/1979 | |
| JP | 56-72730 U | 6/1981 | |
| JP | 57-37827 U | 2/1982 | |
| JP | 63-189224 A | 8/1988 | |
| JP | 3-43342 A | 2/1991 | |
| JP | 03-076625 A | 4/1991 | |
| JP | 07-300121 A | 11/1995 | |
| JP | 09-039934 A | 2/1997 | |
| JP | 09039934 A | 10/1997 | |
| JP | 10181734 A | 7/1998 | |
| JP | 10230919 A | 9/1998 | |
| JP | 2000229615 | 8/2000 | |
| JP | 2002-127237 A | 5/2002 | |
| NZ | 506684 | 9/2001 | |
| NZ | 512423 | 9/2001 | |
| NZ | 521694 | 10/2003 | |
| WO | WO 93/09031 A1 | 5/1993 | |
| WO | WO 93/12975 A1 | 7/1993 | |
| WO | WO 97/34808 A1 | 9/1997 | |
| WO | WO 00/51895 A1 | 9/2000 | |
| WO | WO 01/40081 A1 | 6/2001 | |
| WO | WO 02/02418 A1 | 1/2002 | |
| WO | WO 02/18213 A1 | 3/2002 | |
| WO | WO 02/085755 A1 | 10/2002 | |
| WO | WO 2004/028910 A1 | 4/2004 | |
| WO | WO 2004/106176 A2 | 9/2004 | |
| WO | WO 2004/106175 A1 | 12/2004 | |
| WO | WO 2005/012091 A2 | 2/2005 | |
| WO | WO 2006/113428 A3 | 10/2006 | |

OTHER PUBLICATIONS

International Search Report for PCT/US2005/008374 dated Aug. 2, 2005.

IPRP (including Written Opinion) for PCT/US2005/008374 dated Sep. 13, 2006.

The file wrapper and contents of U.S. Appl. No. 60/220,326, filed Jul. 24, 2000 dated Oct. 29, 2008.

Office Action for U.S. Appl. No. 10/566,294 dated Oct. 27, 2008.

Office Action for U.S. Appl. No. 10/851,083 dated Nov. 11, 2008.

Final Office Action for U.S. Appl. No. 10/851,083 dated Jun. 12, 2008.

Office Action for U.S. Appl. No. 10/851,083 dated Sep. 6, 2007.

International Search Report for PCT/US2004/024581 dated Jul. 25, 2005.

IPRP (including Written Opinion) for PCT/US2004/024581 dated Jan. 30, 2006.

International Search Report for PCT/US2004/016405 dated Feb. 15, 2005.

IPRP (Including Written Opinion) for PCT/US2004/016405 dated Nov. 25, 2005.

Office Action for Application No. EP 06 750 165.0—2307 dated Nov. 24, 2008.

International Search Report for PCT/US2006/040361 dated Feb. 26, 2007.

IPRP (including Written Opinion) for PCT/US2006/040361 date Apr. 16, 2008.

International Search Report for PCT/US2007/006318 dated Sep. 11, 2007.

IPRP (including Written Opinion) PCT/US2007/006318 dated Sep. 16, 2008.

International Search Report for PCT/US2006/014055 dated Dec. 7, 2006.

IPRP (including Written Opinion) PCT/US2006/014055 dated Oct. 16, 2007.

Examination Report dated Mar. 26, 2009, New Zealand Patent App. No. 550336.

* cited by examiner

PROCESS AND DEVICE FOR CONVEYING ODD-SHAPED CONTAINERS

BACKGROUND OF THE INVENTION

1. Field of the Invention

The present invention relates generally to the conveyance of unstable, empty containers in a production line, and more particularly to a transfer stabilization support that temporarily attaches to a top-heavy or odd-shaped container with a non-round bottom surface end so that the top-heavy or odd-shaped container can be easily conveyed throughout the production line.

2. Related Art

Typically, containers are formed with a stable base surface so that the containers can easily be conveyed in a table-top fashion along a production line. Generally, containers are moved freely through a production line by standing the container on its base surface and pushing the container via air along the production line. The production line may start when the container exits the container forming operation and continue to filling and capping operations and then to a cooling operation, if necessary. However, the shape of some of the containers do not lend themselves to be conveyed along a production line in the table-top fashion.

Some containers may have a narrower bottom end than an upper end of the container. The wider upper portion and the narrower bottom end, while having a relatively smooth surface, produce a container that cannot be easily conveyed when the container is empty, because the upper end produces a top-heavy empty container that may topple over on its side when the container is pushed via air or other means. Similarly, long slender containers typically have poor line conveyance due to a high center of gravity. While conventional hot-fill technology incorporates a number of recessed panels that are placed in the mid-section of the container, emerging technologies in the hot-fill area are producing hot-filled containers with a vacuum absorption panel, which is recessed, at the lower third of the container. That is, the recessed panel is being moved to the lower third of the container resulting in a containers being formed with a slender lower or standing portion, which tends to tip over when being pushed by air, for example, when being guided to a conveyor in a table-top production line. An empty top-heavy container can result also from "light-weighting" the base and sidewalls of a container to reduce the cost of the container since the finish area of the container retains its weight in grams of plastic material in order to provide integrity for the closure. Other containers may have a substantially rounded base or a projection extending outward from a bottom end of the container, which inhibits the conveying of the container in the least expensive production line (i.e., a table-top conveying system).

Thus, such odd-shaped containers either cannot be conveyed in the table-top fashion, or their conveyance in a table-top fashion results in numerous toppled containers and requires costly, constant supervision to facilitate the movement of the containers through the production line. Consequently, a complex system of conveyors was thought necessary in order to convey the odd-shaped container through the filling, capping, batching and cooling operations. Such a complex system of conveyors for a production line is a costly investment since it may only be useful for a single odd-shaped container.

In order to provide lightweight (and less costly) containers, it is known in the art to remove the gram weight out of the sidewalls and bottom of the containers. However, this method adds to the instability of the formed lightweight container, as it is conveyed in a conventional table-top system, as the center of gravity moves upwards as gram weight is removed from the bottom and sidewalls of the container resulting in a container that is easier to tip over. This trend for lightweight containers and the trend to move the vacuum compression panels to the lower third of the container presents a challenge in conveying the new containers in a cost-efficient manner.

A complex conveying system involving rails that hold the containers by their necks can handle containers that tend to topple over when pushed or controlled by air in a table-top conveying system. While neck conveying guide rails may be suitable for conveying some containers along a portion of a production line, the neck rail conveyor is not suitable for entry into a cooling tunnel and exiting therefrom, as a cost-effective, cooling operation is typically achieved by cooling a number of the containers at one time.

Moreover, a rail neck conveying system is designed only for containers having substantially the same neck size. Accordingly, reliance on a rail neck conveying system would involve such inefficiencies as changing the entire rail neck conveying system to enable the conveying of a different type of container, such as a container with a different sized neck. This would result in an unacceptable level of downtime and would limit the design of containers used by this specialized rail device to a small number of containers.

Consequently, what is needed is a process for conveying top-heavy and odd-shaped containers in a cost-effective manner. This is especially true for conveying containers that are to be filled with a hot product and then are cooled in a production line. In order for these containers to be conveyed in the table-top fashion in a production line (e.g., from the blow-molded stage, where the container is formed to a capping and filling operation), a temporary transfer stabilization support is needed.

BRIEF SUMMARY OF THE INVENTION

In summary, the instant invention employs a transfer stabilizing support that temporarily surrounds a bottom end of a blow-molded or other formed container to provide a stable surface and add temporary weight so that the container can be easily conveyed in the table-top manner through the filling, capping and cooling operations, if necessary. The process for conveying top-heavy and odd-shaped containers, according to the invention, temporarily secures a transfer stabilizing support to the bottom end of a formed container so that the container can freely move along a production line in the table-top manner, and after the container has gone through the production line, the transfer stabilizing support is removed so that the aesthetic qualities of the formed container shape are revealed. As stated above, the transfer stabilizing support, according to the invention, adds temporary weight to the bottom of a lightweight container and/or top-heavy containers to provide both added stability and enhanced handling characteristics.

The transfer stabilizing support, according to the invention, is designed to fit any number of containers that may be formed by a blow-molding or like operation. Such a transfer stabilizing support, according to the invention, would include a bottom surface with an opening for receiving a rod or other mechanical means to remove the temporary support from a container and a wall extending substantially perpendicular from the bottom surface that is provided with projections to temporarily grip the bottom side of a container.

The bottom surface of the transfer stabilizing support may provide an increased "standing ring" or a larger, stable standing area so that an odd-shaped or top-heavy container may be conveyed with ease and with fewer problems then those associated with conveying the same via air control in a table-top fashion. While the term "ring" is used, the design of the transfer stabilizing support and the bottom surface may be rectangular, square or triangular, depending upon the shape of the container being conveyed. In some instances, the transfer stabilizing ring may be used with containers that may be able to conveyed on their own in the table-top manner to add temporary weight and thereby improve the handling characteristics of these containers.

The transfer stabilizing support may be temporarily secured to a formed container that is top-heavy and act as a counterbalance during conveyance along a table-top production line. The shape of the transfer stabilizing support corresponds generally to the shape of the container to which it is to be attached and the gripping projections on the wall of the support secure the support to the container. In this manner, the weight of the transfer stabilizing support may be temporarily secured to the bottom end of a container causing the center of gravity of the container to be lowered for more efficient transfer of the container through the filling operation in a production line.

In addition to the weight that the transfer stabilizing support may add to a container, the bottom of the support may be formed with a stabilization surface that increases the amount of surface contact with the table-top conveyor. This stabilization surface increases the control over and the plurality of the container to transfer through the filling line by effectively adding more surface contact area with the table-top conveyor.

The substantially perpendicular wall (sidewall) of a support may provide additional support and act as a brace to the lower end of a lightweight or thin container during the filling process, as the more rigid sidewalls of the support may resist the container's tendency to bow outward during the filling operation and/or cooling operation of a conveying process according to the invention. In addition, the rigid sidewall of the support may reduce line handling damage to the lower end of the container.

In another embodiment of the transfer stabilization support according to the invention, the bottom surface may have a ridge projecting from the bottom surface in the same direction as the perpendicular wall and spaced therefrom. Each support, for different volumetric containers, would be designed so that its ridge creates a uniform height at which the neck of the container is presented to the filling and capping stations. Alternatively, a transfer stabilizing support may be provided with inserts that would achieve the function of the ridge. In this way, the same transfer stabilizing supports could be used and an insert could be placed therein to present necks of different containers at a uniform height. This feature would greatly limit the amount of downtime spent adjusting the production line for another type of container and would limit the amount of parts needed to modify a production line for similar, yet different height, containers.

Since circular containers tend to move more easily through a production line, it is envisioned that containers with rectangular or triangular-shaped bases may be provided with a temporary transfer stabilization support to aid in the transfer efficiency of the container during line production. That is, a square-like base may be temporarily secured to a circular transfer stabilizing support that has inserts firmly attached to the bottom surface adjacent the wall of the support. Alternatively, circular supports may be attached to substantially cylindrical containers so that the same support can be used with containers or different diameters, or, a square-shaped support may be attached to a substantially cylindrical container.

This invention is in a crowded and mature art and achieves a novel process for efficiently conveying containers along a table-top conveying system, which includes the steps of temporarily securing a transfer stabilizing support to a bottom end of a formed container so that the container can freely move along a production line using the table-top conveying system, and after the container has gone through operations of the production line, the transfer stabilizing support is removed so that aesthetic qualities of the formed container shape are revealed. The transfer stabilizing support, according to the invention has a bottom surface with an opening, a sidewall extending substantially perpendicular to the bottom surface, and a ridge area surrounding the opening and inside the sidewall of the support where the ridge area serves to accommodate changes in height of different containers to be conveyed.

The ridge area may be formed by an insert that is securely placed inside a cup-enclosure formed by the bottom surface and the wall of the transfer stabilization support. In another embodiment, a generic shell for a transfer stabilization support may be designed so that, depending upon an insert placed in the shell, a container with a rectangular, square, circular or triangular base can be attached to the support. An insert would be placed inside the generic shell of the support that has a diameter corresponding to that of the container that is to be conveyed. The insert would securely grip the container to be conveyed, as well as ensure that the presentation height of the neck of the container is substantially uniform for the plurality of containers.

Further objectives and advantages, as well as the structure and function of preferred embodiments, will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

FIG. 3 is a top view of the transfer stabilization support shown in FIG. 1a;

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

Figure 1A:
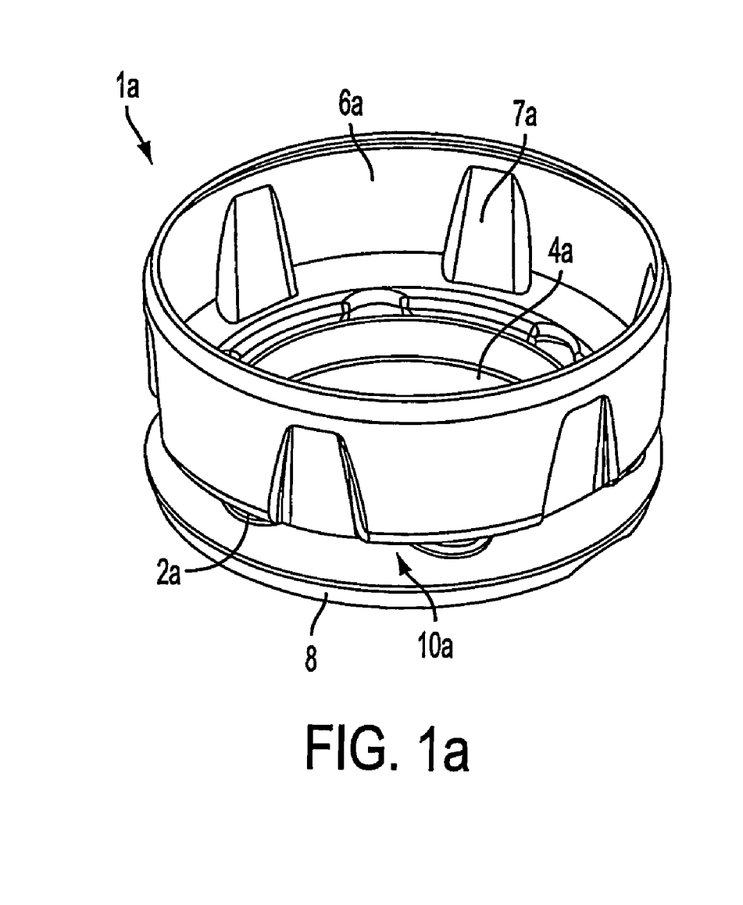
FIG. 1a depicts an exemplary embodiment of a transfer stabilization support according to the present invention.
Figure 1B:
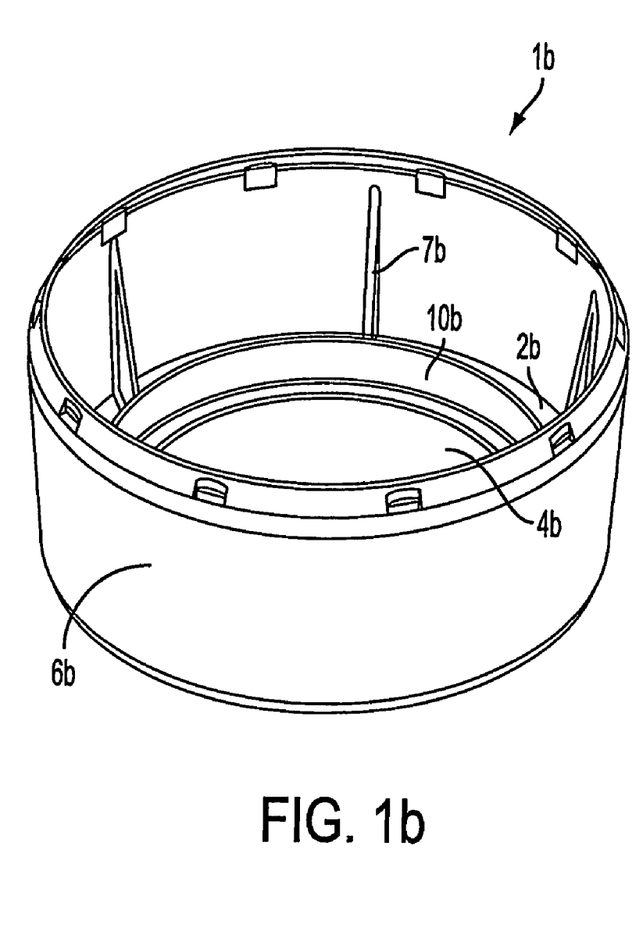
FIG. 1b depicts another exemplary embodiment of a transfer stabilization support according to the present invention.

Looking at FIGS. 1a and 1b, two embodiments of the inventive, transfer stabilization support 1a and 1b are shown, which when secured to a container provide stability and enhanced handling characteristics to a conveyed container. Each support 1a, 1b has a bottom surface 2a, 2b with an opening 4a, 4b and a wall 6a, 6b extending perpendicularly from an outer edge of bottom surface 2a, 2b forming a cup-like enclosure. The cup-like enclosure corresponds to an outer diameter of a container to be conveyed so that the support 1a, 1b can be securely attached to the container. The thickness of the wall 6a, 6b can vary depending upon the shape of the transfer stabilization support. The support is made from a plastic material, for example, polyethylene terephthalate (PET), polypropylene, polyethylene material or similar materials, and has a sufficient thickness to ensure the wall will remain stable during filling, capping and a cooling operation. That is, wall 6a, 6b is of sufficient thickness to brace thin sidewalls of a container being conveyed during the production line process thereby assisting in the strength of the container being conveyed so that line handling abuse of the lower extremity of the container is minimized. Depending upon the size of the container to be conveyed with the temporary transfer stabilization support, the height of the wall 6a, 6b may vary, as may the shape and/or profile of the support. The opening 4a, 4b is designed so that it does not interfere with an odd-shape projection from the base of a container and provides room to separate a secured transfer stabilization support from a container.

The transfer stabilization support 1a, 1b may be made out of similar or dissimilar material from that of the container and is ideally made of plastic material. That is, support 1a, 1b can be made from leftover material used to make the container, in particular, scrap pieces of material. Thus, the transfer stabilization support could be made out of recycled material that was not necessary for making the containers or trimmed off during the container manufacturing process. Consequently, the production of transfer stabilization supports may employ scrap plastic from the same or another production job. This provides more cost-savings in that the material used to make the supports can be obtained from leftover material from a container making process.

A first function of the transfer stabilization support according to the invention is to provide a temporary counterbalance weight that is to be securely attached to a lower portion of a container. In addition to the shape of the cup-like enclosure formed by wall 6a, 6b corresponding to base of a container, wall 6a, 6b includes ribs 7a, 7b that project into the closure to securely hold and/or support the contour of the container base. Ribs 7a, 7b are projections that extend into the cup-like enclosure and, as illustrated in FIGS. 1a and 1b may be triangular in shape. Depending upon the amount of weight desired to be added to a container, the shape of the projecting rib 7a, 7b may vary and may be rectangular or some other shape. The function of the projecting rib 7a, 7b is to take up space in the cup-like enclosure so that support 1a, 1b can be secured to the bottom of a container in a friction-fit manner.

In some instances, the rib 7a is molded into a side of the wall so that the outer wall shows a recessed projection area and the inner wall shows the projecting rib 7a with the base of the molded rib 7a adjacent bottom surface 2a extending further into the cup-like enclosure than the top of molded rib 7a. This arrangement provides sufficient support to a container and provides sufficient weight, while not requiring too many grams of plastic material to make the support. In the exemplary embodiment shown in FIG. 1b, projecting ribs 7b extend from sidewall 6a into the cup-like enclosure in a triangular shape. That is, the base of projecting rib 7b adjacent bottom surface 2b is the short side of a right triangle that extends into the cup-like enclosure and the longer side of the right triangle extends away from bottom surface 2b along sidewall 6b with the width of the projecting rib 7b decreasing as the rib moves away from bottom surface 2b. Accordingly, a container that is to be temporarily secured to transfer stabilization support 1a, 1b may have a bottom side that curves toward the center of the container and the wider base of the projecting rib 7a, 7b would be able to rub against the bottom side without damaging the container, as the widest part of the projection rib is at the bottom surface on which the container rests. It is through these shapes that projecting ribs 7a, 7b serve as grippers that grip the containers temporarily in a friction-fit manner in the transfer stabilization support. As stated above, the shape of the projecting ribs may vary depending upon the shape of the container. It is envisioned that the projecting rib may be a plurality of projecting rib segments that are formed to bump out of the sidewall and grip a container to be secured to a support. The added weight of the transfer stabilization support to the bottom of an empty container serves to lower the center of gravity of the container to be conveyed for more efficient transfer during the filling process, for example.

Figure 2:
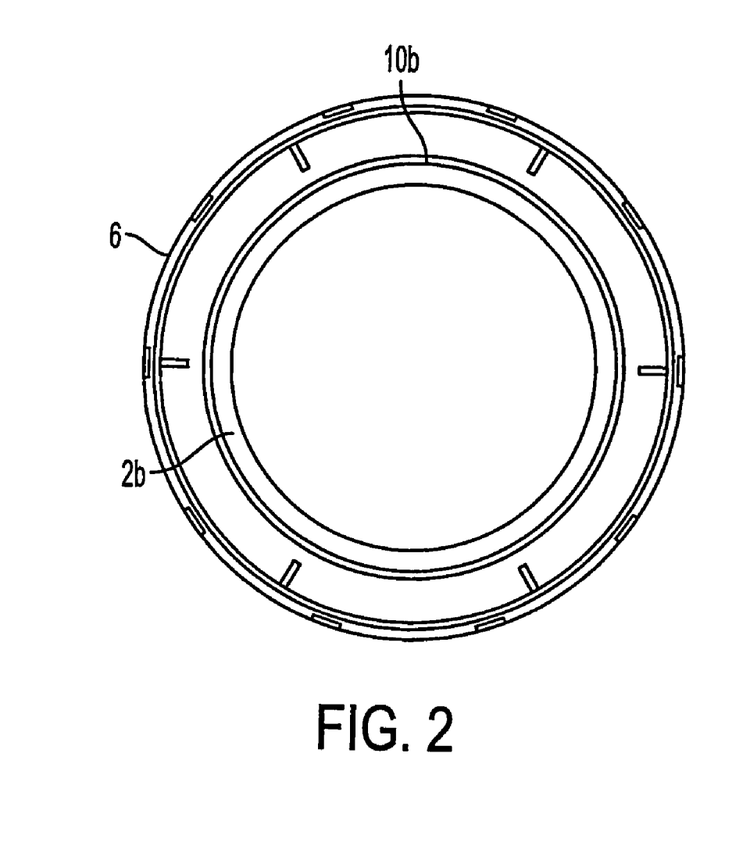
FIG. 2 is a top view of the transfer stabilization support shown in FIG. 1b.

While a filled container may only need a small area of contact so that the product stands on a grocer's shelf or in a consumer's cabinet or refrigerator appliance, a larger amount of surface contact is conducive for enhancing control and handling of a container during the transfer along a production line, particularly before the container is filled. Accordingly, support 1b is made with a bottom surface 2b that rests on the table-top conveyor and may increase the surface contact area with the table-top conveyor. As shown in FIG. 2, ridge area 10b is concentrically spaced from wall 6b and is positioned so that bottom surface 2b extends on either side. As a result of this structure, the surface contact area of the bottom of the container can be increased. Further, the ridge area provides support to a non-flat container bottom, i.e., contacts a container at a position away from the relatively flat portion of the container to provide additional balance during the production process.

Figure 3:
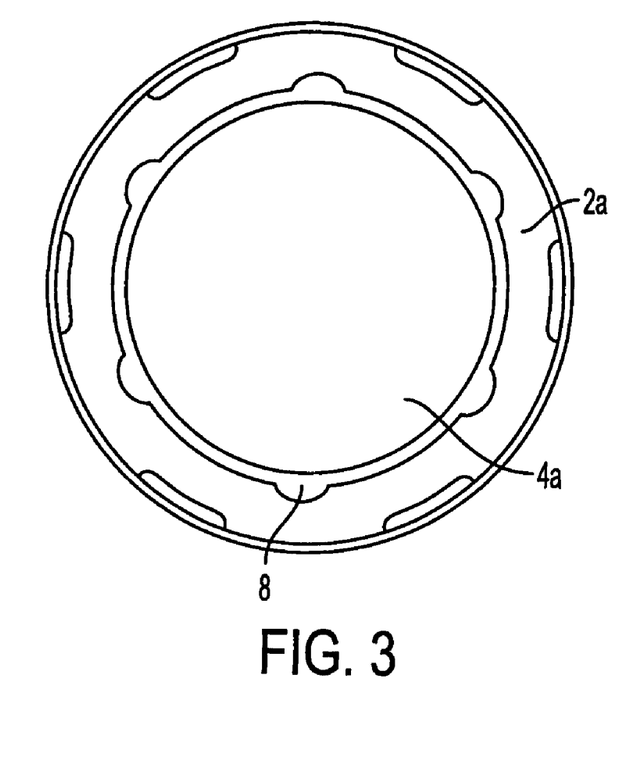

Support 1a has a bottom surface 2a that is attached to a pedestal 8, which increases the surface contact area with the table-top conveyor. Pedestal 8 is formed with an opening so that opening 4a continues throughout support 1a and has a ridge area 10a, which has a smaller diameter than that of the pedestal and is concentrically spaced from wall 6a of support 1a. As shown in FIG. 3, the inner diameter of bottom surface 2a of support 1a is smaller than the inner diameter of pedestal 8. If necessary, weight may be trimmed from this embodiment by providing indentations at the inner diameter of bottom surface 2a. In this embodiment, the height of the ridge area 10a (shown in FIG. 5) may change to determine the height of the neck of the container to be conveyed. Alternatively, inserts [12—not shown] may be placed inside the cup-like enclosure to modify the height of the bottom of the cup-like enclosure so that a plurality of containers can be attached to support 1a and present their necks at a uniform height. Likewise, support 1b may be provided with inserts to modify the height of the bottom of the cup-like enclosure.

Support 1b is formed with a ridge area 10b concentrically spaced from wall 6b and projecting into the cup-like enclosure from bottom surface 2b. According to this embodiment of the transfer stabilization support of the present invention, the height of the ridge area 10b can be modified to accommodate changes in height of containers to be conveyed. In this embodiment, inserts could be used to modify the size/shape of the support and the height of the ridge area. For example, single-serve beverage containers vary from as large as 32 oz. to a small 8 oz. container. The outside diameter of the support would be designed to accommodate and snugly fit with a 32 oz. container and inserts could be used to modify the inside diameter to a smaller container to be conveyed. The inserts would be securely attached to the generic shell of the support and would then accommodate a variety of different volume size containers to receive the same product.

In addition to modifying the inner diameter to correspond to a smaller container, the insert could raise the ridge area so that the presentation height of a smaller container would be uniform with the presentation height of a larger container. The ability of the transfer stabilization support to raise and lower the base upon which the container rests will greatly limit the downtime associated with conventional production lines that change containers that receive the same product. In addition, a smaller number of parts will be needed to accommodate a variety of container sizes, as it is the support that changes and not the actual production line system.

Figure 4:
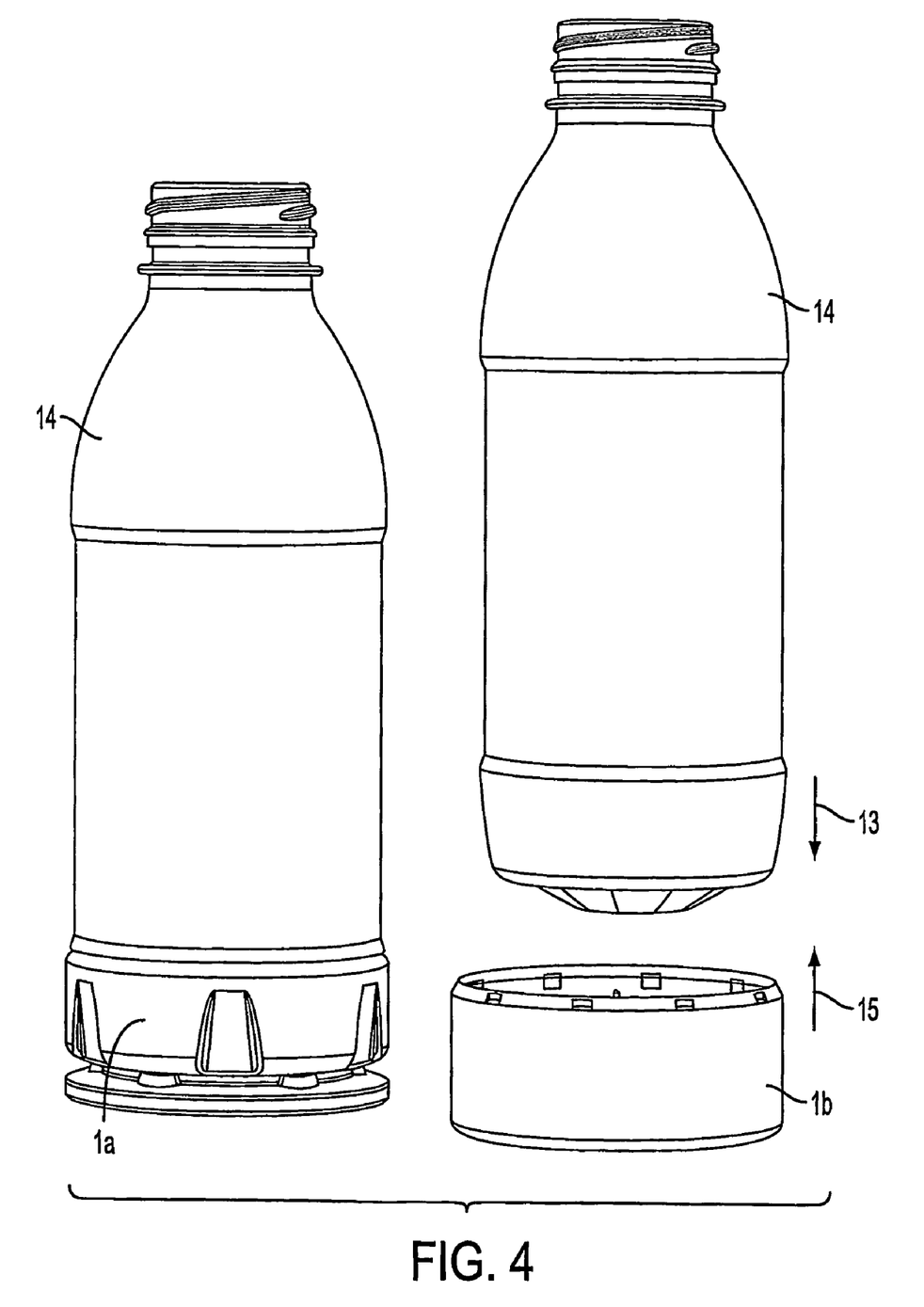
FIG. 4 illustrates a container that will be inserted into a transfer stabilization support and a container securely attached to a transfer stabilization support according to the present invention.

As illustrated in FIG. 4, a container 14 may be pressed into a transfer stabilization support 1a, 1b (in the direction represented by arrow 13) that is positioned underneath a container 14 exiting a container forming operation so that support 1a, 1b is temporarily secured to a lower portion of container 14. Alternatively, support 1a, 1b may be moved (in the direction represented by arrow 15) against a container 14 held in its position when exiting a container forming operation. The operation of temporarily securing a transfer stabilization support to a lower portion of a container 14 may be accomplished in a rotary mechanism. The lower portion of container 14 substantially corresponds to the shape/profile of support 1a, 1b and the rib projections 7a, 7b of support 1a, 1b grip the lower portion sidewall of container 14 in a friction-fit manner. Once containers 14 are temporarily secured to a transfer stabilization support 1a, 1b, they can be easily transferred along a table-top conveying system as a normal container with a flat bottom portion is. If desired, containers 14 with a transfer stabilization support temporarily secured thereto may be placed in a pallet and moved to an off-site filling operation. When the palletized containers reach the of-site filling operation, containers are depalletized onto a table-top conveyor production line system that includes filling the container 14 with a product and then capping container 14. If a hot-filled product is poured into a container 14, a cooling operation would occur after the capping operation. In this situation, containers 14 with a transfer stabilization support secured thereto could be placed in a pallet or other container so that a large number of containers could be cooled.

Figure 5:
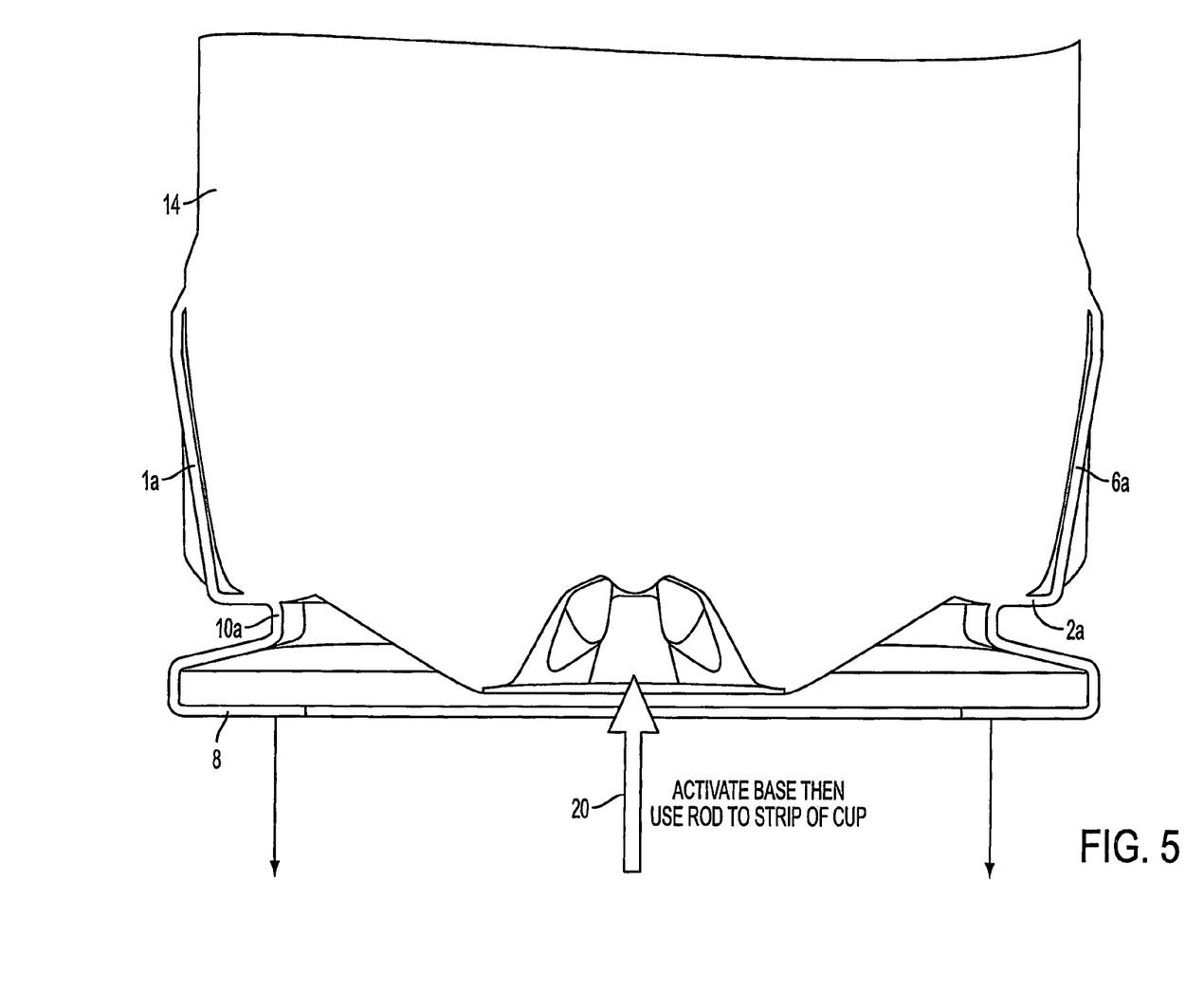
FIG. 5 illustrates the removal of a temporarily secured transfer stabilization support from a container according to one embodiment of the invention.

As schematically shown in FIG. 5, the transfer stabilization support is removed from a container. First, a mechanical apparatus would capture a container 14 with a transfer stabilization support attached thereto and then, a rod (represented by arrow 20) would be inserted within opening 4a, 4b so that the rod abuts a bottom of container 14. Container 14 is held in its position as rod 20 is pushed against the bottom of container 14 causing container 14 to break free of the friction-fit of wall 6a and projecting ribs 7a. Thus, after the cooling operation, the container may be stripped of the temporary transfer stabilization support so that the aesthetic qualities of the container's shape are revealed. Accordingly, the instant invention allows containers that are top-heavy and/or have an odd-shape to be conveyed along a filling and capping production line in a cost-effective manner.

If an container (as shown in FIG. 5) has the ability to accommodate vacuum absorption though an outwardly projecting base structure, the protruding base should be inverted inside container 14 after the cooling process, which induces a vacuum that distorts the shape of container 14, thereby forcing the container into its intended shape for consumer use. If such a container is used, the mechanical apparatus described above that employs rod 20 to strip the transfer stabilization support could serve two purposes. The first object would be to push the protruding base of container 14 inside container 14. The rigid sidewalls of the transfer stabilization support 1a should resist the container's tendency to bow outwardly at the lower sidewall of the container during the inversion of the outwardly protruding base. As a result, the transfer stabilization support assists the ability to draw the projecting base inward without damaging a lower sidewall of container 14 and countering the induced vacuum that distorted container 14 during the cooling process. The second object is the removal of the transfer stabilization support, as previously described.

Looking at FIG. 5, the bottom surface 2a, it forms a ledge upon which a standing area of a container 14 rests. The standing area of a container is the relatively flat surface of the container that contacts the ground upon which the container stands. In some instances, the standing area may be the entire bottom surface of a container or the standing area may be a small "ring" area 16 at or near the outer periphery of the bottom of the container, as shown in FIG. 5. The height of the ridge area 10a may be designed so that a projecting bottom portion of the container may extend to the base of the pedestal 8. That is, the height of the ridge area may be determined by the depth of a projection base portion, in addition to the height that would present the neck of the container at the desired position. In the other exemplary embodiment, the standing area of a container 14 rests on the projection of ridge area 10b. Similarly, the height of ridge area 10b may be determined by the depth of a projection base portion.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A process for conveying plastic containers along a table-top conveying system, comprising the steps of:
   temporarily securing a transfer stabilizing support to a bottom portion of a formed, plastic container so that the plastic container can move along a production line using the table-top conveying system, said transfer stabilizing support having a bottom surface with an opening, a sidewall extending substantially perpendicular from said bottom surface to form an open enclosure, rib projections formed in one piece with said sidewall and extending into said open enclosure from said sidewall, substantially toward a center longitudinal axis of said open enclosure, and a ridge area concentrically spaced from said sidewall of said transfer stabilizing support, wherein said ridge area is arranged to set a presentation height of the temporarily secured container at one or more of a filling station and a capping station of the production line;

filling, at the filling station, the plastic container temporarily secured to said transfer stabilizing support with a hot product;

capping, at the capping station, the hot-filled plastic container temporarily secured to said transfer stabilizing support;

creating a vacuum in the hot-filled and capped plastic container temporarily secured to said transfer stabilizing support, said creating a vacuum including cooling the hot-filled and capped plastic container using a cooling system;

manipulating, after the vacuum has been created in the plastic container, a bottom end portion of the plastic container to counter the vacuum created in the plastic container temporarily secured to said transfer stabilizing support; and after the plastic container has gone through said filling, capping, creating, and manipulating, removing said transfer stabilizing support from said bottom portion of the plastic container.

2. The process of claim 1, wherein the step of temporarily securing said transfer stabilizing support to the bottom portion of the formed plastic container further includes pressing said transfer stabilizing support against a bottom end of said bottom portion of the plastic container so that bottom sides of the plastic container are gripped by the rib projections in a friction-fit manner.

3. The process of claim 2, wherein the step of temporarily securing said transfer stabilizing support to the bottom portion of the formed plastic container further includes securely inserting a spacer in the interior of the transfer stabilizing support to form the ridge area concentrically spaced from said sidewall of said transfer stability support so that said presentation height of the plastic container at said filling and capping operations is uniform for various containers.

4. The process according to claim 1, wherein the step of temporarily securing said transfer stabilizing support to a bottom portion of the formed plastic container further includes centering said transfer stabilizing support below the formed plastic container, and then inserting said bottom portion of the plastic container into said transfer stabilizing support so that bottom sides of the plastic container are gripped by the rib projections in a friction-fit manner.

5. The process according to claim 1, wherein the operations of the production line further include:
palletizing a number of said plastic containers;
moving the palletized number of plastic containers to the filling station; and
de-palletizing the plastic containers onto another production line for the filling station.

6. The process according to claim 1, wherein said temporarily securing includes temporarily securing an unstable plastic container.

7. The process according to claim 1, wherein said temporarily securing includes temporarily securing a plastic container having a stable base.

8. The process according to claim 1, wherein said manipulating includes movement of a mechanical means through the opening of said transfer stabilizing support to invert an outwardly projecting base portion of the plastic container.

9. The process according to claim 8,
wherein said manipulating includes movement of a mechanical apparatus into the opening of said transfer stabilizing support to push toward the interior of the plastic container a portion of the bottom end portion of the plastic container, and
wherein said removing includes movement of said mechanical apparatus into the opening of said transfer stabilizing support to remove said transfer stabilizing support from said bottom portion of the plastic container.

10. The process according to claim 1, further comprising bracing, during said creating a vacuum, a sidewall portion of the plastic container using the sidewall of said transfer stabilizing support.

11. The process according to claim 10, wherein said bracing resists deformation of the plastic container.

12. The process according to claim 1, further comprising bracing, prior to said manipulating, a sidewall portion of the hot-filled and capped plastic container having a vacuum created therein using the sidewall of said transfer stabilizing support.

13. The process according to claim 12, wherein said bracing resists deformation of the plastic container.

14. The process according to claim 1, further comprising, during said manipulating, resisting deformations of the plastic container using the sidewall of said transfer stabilizing support.

* * * * *